Patented Oct. 26, 1937

2,096,933

UNITED STATES PATENT OFFICE 2,096,933

PROCESS FOR THE MANUFACTURE OF MICROPOROUS RUBBER COMPOSITIONS

William J. Burgess, Palmyra, N. J., assignor to The Electric Storage Battery Company, Philadelphia, Pa., a corporation of New Jersey No Drawing. Application March 30, 1934, Serial No. 718,209

9 Claims. (Cl. 18—53)

This invention relates to the production of microporous diaphragms suitable for use as filters or as separators for storage battery cells.

Several methods have heretofore been proposed for the production of porous material composed of vulcanized rubber or the equivalent with or without the admixture of inert fillers in powdered form, the product being permeated by minute pores of microscopic dimensions rendering it suitable for use as a filter or a porous diaphragm in an electrolytic cell such as a storage battery. In all of these previous disclosures the rubber is introduced either in the form of a solution or an emulsion (rubber latex being an example of the latter), or is at some stage subjected to the action of a solvent.

I have discovered that a similar, microporous, rubber product having the characteristic of ionic permeability recognized as essential to a successful battery separator may be produced from gum rubber without the necessity of passing it through the condition of solution or emulsion or subjecting it to a solvent. This result is accomplished by processing the gum rubber with fillers of a certain definite type capable of swelling by the application of water, in a manner analogous to standard rubber procedure involving mixing, plasticizing and shaping by calendering and molding.

The fillers employed in my process are those having the characteristics of hydrophilic colloids as described by the Bureau of Standards, Technical Paper #438. They have a strong affinity for water with which they appear to combine either by adsorption or in other ways not fully understood. These fillers include such diversified products as clays of the bentonite or zeolite type, artificial zeolites, such as "permutit", comminuted and thoroughly pulverized cellulosic material, gums capable of forming a gel with water, such as tragacanth, agar-agar, karaya, and gelatin, and gels of the silica type, added as such or formed in situ. These hydrophilic colloids may be divided into two classes. In the case of the gels, the water is taken up by the substance itself, causing the individual particles to swell. In the case of the clays, the water is attracted to the surfaces of the particles and adheres as a film, causing an apparent and equivalent increase in the particle size. The mixture of rubber and filling material of the class described is vulcanized under water or in an atmosphere of steam. The product thus produced possesses properties enabling its use as a porous diaphragm in electrolytic cells and at a lower cost than that attained by other processes with which I am familiar.

The proportions given in the following examples are by weight and not by volume.

As an embodiment of this invention in its simplest form, the following formula is given:

| | Parts |
|---|---|
| Rubber | 25 |
| Sulfur | 10 |
| Bentonite | 65 |

Mix on a mill, calender to shape, and vulcanize under water or in an atmosphere of steam, with or without previous soaking in water.

Cellulosic fibers may be substituted for bentonite, these fibers becoming comminuted to a finely divided state in the milling of the material.

As an embodiment using gels of the silica type, the following procedure is suggested:

| | Parts |
|---|---|
| Rubber | 25 |
| Sulfur | 10 |
| Powdered sodium silicate | 65 |

Mix on a mill, calender to shape, soak in a dilute acid, or a salt solution whereby the sodium silicate is transformed to gel, and vulcanize under water or in an atmosphere of steam.

The procedure may be varied to include the mixing of two or more of the special fillers referred to, such as clay, silicate, gums or cellulosic fibers, in a wet state, in any proportions, drying said mixture, and pulverizing said mixture. As an embodiment using this method, the following procedure is suggested:

| | Parts |
|---|---|
| Rubber | 25 |
| Sulfur | 10 |
| Dry pulverized mix | 65 |

Mix on a mill, calender to shape, vulcanize in an atmosphere of steam or under water, with or without previous soaking in water, dilute salts, or dilute acids.

The exact theory, as to how the microporous structure is developed in the process disclosed above, is not thoroughly understood. It is believed to be brought about by the penetration of aqueous moisture through the exceedingly thin membranes of rubber surrounding the particles of filler. The taking up of this moisture by the particles of filler causes a swelling of the entire mass, putting the rubber films under tension. The vulcanizing process causes a hardening of the rubber and a reduction of its elasticity, thus causing disruption of the rubber membranes, Whatever the theory, I have found that, to accomplish the microscopic porosity desired, it is necessary to use fillers having the special characteristics common to those listed above. The aqueous bath prior to vulcanization may be omitted if the material is subjected to a sufficient amount of moisture during the early stages of the vulcanizing process. The time required for this preliminary soaking prior to vulcanization will depend upon the particular type of filler used and the porosity and strength desired in the final product.

I do not intend to be limited save as the scope of the prior art and of the attached claims may require.

I claim:—

1. The process of making a microporous diaphragm which consists in plasticizing by means of repeated and continuous milling an admixture of unsoftened gum rubber in a solid state and a dry hydrophilic colloid capable of swelling when wet with water and a vulcanizing agent, mechanically shaping the plasticized mass, swelling the colloid particles and putting the rubber in tension by subjecting the shaped mass to the action of water, and hardening and disrupting the rubber from a state of tension by vulcanizing the mass in contact with moisture thereby providing microporosity.

2. The process of making a microporous diaphragm which consists in plasticizing by means of repeated and continuous milling an admixture of unsoftened gum rubber in a solid state and a dry hydrophilic colloid capable of swelling when wet with water and a vulcanizing agent, mechanically shaping the plasticized mass, and swelling the colloid particles and disrupting and hardening the rubber by vulcanizing the mass in contact with water moisture thereby providing microporosity.

3. The method of making a micro-porous, chemical-resistant, semi-rigid diaphragm, which comprises, mixing dry fibrous cellulosic material with gum rubber and sulphur with a sulphur-rubber ratio suitable for vulcanization to hard rubber, plasticizing the rubber by means of repeated and continuous milling, thereby completely grinding the fibrous ingredients to colloidal dimensions, mechanically shaping the plasticized mass, and vulcanizing under water.

4. The method of making a micro-porous, chemical-resistant, semi-rigid diaphragm, which comprises, mixing dry fibrous cellulosic material with gum rubber and sulphur with a sulphur-rubber ratio suitable for vulcanization to hard rubber, plasticizing the rubber by means of repeated and continuous milling, thereby completely grinding the fibrous ingredients to colloidal dimensions, mechanically shaping the plasticized mass, and vulcanizing in an atmosphere of steam.

5. The method of making a micro-porous, chemical-resistant, semi-rigid sheet material, which comprises, mixing dry clays of the bentonite or zeolite type with gum rubber and sulphur, plasticizing by repeated milling of the mix, shaping, and then moistening and vulcanizing in the presence of moisture.

6. The method of making a micro-porous, chemical-resistant, semi-rigid sheet material, which comprises, mixing dry clays of the bentonite or zeolite type with gum rubber and sulphur, plasticizing by repeated milling of the mix, shaping, soaking in water, and vulcanizing in the presence of moisture.

7. The process of making a micro-porous, chemical-resistant, semi-rigid electrolytic diaphragm having ionic permeability which process comprises, mixing on a mill in a dry state an admixture of gum rubber in a solid and unsoftened state and a dry hydrophilic colloid capable of swelling when wet with water and a vulcanizing agent, mechanically shaping the admixture, swelling the colloid particles and putting the rubber in tension by subjecting the shaped mass to the action of water, and hardening and disrupting the rubber from a state of tension by vulcanizing the mass in contact with moisture, thereby providing microporosity.

8. The method of making a microporous chemically resistant semi-rigid electrolytic diaphragm having ionic permeability which comprises mixing in a dry state a hydrophilic colloid with gum rubber and sulphur in a proportion suitable for vulcanization to hard rubber, mechanically shaping the mass, subjecting the mass to aqueous moisture, and vulcanizing in the presence of moisture.

9. The process of making a semi-rigid microporous electrolytic diaphragm having ionic permeability which includes the steps of preparing a dry admixture of a finely divided hydrophilic substance with rubber and sulphur in a proportion suitable for vulcanization to hard rubber, mechanically shaping the mass while in the dry state, subsequently swelling the hydrophilic particles by subjecting the mass to aqueous moisture, and then setting the binder by the application of heat in the presence of moisture.

WILLIAM J. BURGESS.